United States Patent
Godbillon et al.

(10) Patent No.: US 9,879,788 B2
(45) Date of Patent: Jan. 30, 2018

(54) VALVE THAT CAN BE ELECTROMAGNETICALLY ACTUATED

(71) Applicant: Robert Bosch GmbH, Stuttgart (DE)

(72) Inventors: Pascal Godbillon, Heilbronn (DE); Edgar Kurz, Heilbronn-Horkheim (DE)

(73) Assignee: Robert Bosch GmbH, Stuttgart (DE)

( * ) Notice: Subject to any disclaimer, the term of this patent is extended or adjusted under 35 U.S.C. 154(b) by 15 days.

(21) Appl. No.: 15/026,182

(22) PCT Filed: Oct. 7, 2014

(86) PCT No.: PCT/EP2014/071439
§ 371 (c)(1),
(2) Date: Mar. 30, 2016

(87) PCT Pub. No.: WO2015/052185
PCT Pub. Date: Apr. 16, 2015

(65) Prior Publication Data
US 2016/0230896 A1    Aug. 11, 2016

(30) Foreign Application Priority Data
Oct. 9, 2013  (DE) .................. 10 2013 220 331

(51) Int. Cl.
| F16K 31/02 | (2006.01) |
| F16K 1/36 | (2006.01) |
| B60T 8/36 | (2006.01) |
| F16K 31/06 | (2006.01) |
| F16K 1/12 | (2006.01) |

(52) U.S. Cl.
CPC .............. F16K 1/36 (2013.01); B60T 8/363 (2013.01); F16K 1/12 (2013.01); F16K 31/0655 (2013.01); F16K 31/0665 (2013.01)

(58) Field of Classification Search
CPC .......... F16K 1/36; F16K 1/12; F16K 31/0655; B60T 8/363

(Continued)

(56) References Cited

U.S. PATENT DOCUMENTS 4,723,755 A * 2/1988 Ishigaki .............. F16K 31/0665
251/129.19
5,313,161 A * 5/1994 Miyazawa .......... F16K 31/0655
324/207.16

(Continued)

FOREIGN PATENT DOCUMENTS

CN        102686461 A    9/2012
DE   10 2009 060 294 A1   6/2011

(Continued)

OTHER PUBLICATIONS

International Search Report corresponding to PCT Application No. PCT/EP2014/071439, dated Dec. 8, 2014 (German and English language document) (7 pages).

Primary Examiner — Umashankar Venkatesan
(74) Attorney, Agent, or Firm — Maginot, Moore & Beck LLP

(57) ABSTRACT

An electromagnetically actuated valve, in particular a pressure control valve of a slip-controllable vehicle brake system, includes a seat body with a valve seat, at least one inflow channel, and an outflow channel. The valve includes a shut-off element configured to avoid a hydraulic short circuit between the inflow channel and the outflow channel when the valve seat is closed. The shut-off element is equipped with flow-directing means. The flow-directing means prevent the partial flows from the inflow bores from hitting each other and direct the flow to a closing body, which controls the valve seat, in such a way that a transverse force is applied to the closing body when the closing body performs a stroke motion. The transverse force radially deflects the closing body during an opening or closing motion and causes an effect that stabilizes the stroke motion and dampens radial vibrations.

10 Claims, 4 Drawing Sheets

State of the art

(58) Field of Classification Search
USPC .................................................. 251/129.15
See application file for complete search history.

(56) References Cited

U.S. PATENT DOCUMENTS

| | | | | |
|---|---|---|---|---|
| 6,234,449 | B1* | 5/2001 | Ortner | F16K 31/404 |
| | | | | 251/30.03 |
| 6,267,457 | B1 | 7/2001 | Siegel et al. | |
| 7,661,652 | B2* | 2/2010 | Acar | B60T 8/363 |
| | | | | 137/599.01 |
| 7,896,447 | B2* | 3/2011 | Park | B60T 8/363 |
| | | | | 303/113.2 |
| 8,739,824 | B2* | 6/2014 | Kurz | F16K 31/0655 |
| | | | | 137/597 |
| 8,740,184 | B2* | 6/2014 | Kurz | B60T 8/3615 |
| | | | | 251/129.15 |
| 9,139,179 | B2* | 9/2015 | Heyer | B60T 8/363 |
| 2010/0282989 | A1* | 11/2010 | Hajjar | F16K 31/402 |
| | | | | 251/129.15 |
| 2012/0313022 | A1* | 12/2012 | Godbillon | B60T 8/363 |
| | | | | 251/129.15 |

FOREIGN PATENT DOCUMENTS

| | | |
|---|---|---|
| DE | 10 2010 002 469 A1 | 9/2011 |
| DE | 10 2011 079 339 A1 | 1/2013 |
| WO | 91/04181 A1 | 4/1991 |
| WO | 97/12790 A1 | 4/1997 |
| WO | 2006/040248 A1 | 4/2006 |
| WO | 2011/076469 A1 | 6/2011 |

\* cited by examiner

State of the art  Fig. 1

VALVE THAT CAN BE ELECTROMAGNETICALLY ACTUATED

This application is a 35 U.S.C. § 371 National Stage Application of PCT/EP2014/071439, filed on Oct. 7, 2014, which claims the benefit of priority to Serial No. DE 10 2013 220 331.4, filed on Oct. 9, 2013 in Germany, the disclosures of which are incorporated herein by reference in their entirety.

BACKGROUND

The disclosure relates to an electromagnetically actuatable valve, in particular a pressure regulating valve of a vehicle brake system with traction control. The design construction of such valves is disclosed, for example, by DE 10 2010 002 469 A1 or DE 10 2011 079 339 A1. These valves comprise a seat body, which in addition to a valve seat forms at least one fluid-ducting inlet port and a fluid-discharging outlet port. In order to prevent a hydraulic short-circuit between these ports when the valve seat is closed, a shut-off element is provided. In the state of the art cited, the shut-off elements used take the form of metal balls, which are pressed into a rising bore downstream of the point where the inlet port enters this rising bore. Metal balls are needed in large quantities, for rolling bearings, for example, and are therefore particularly cost-effective and available on the market in the required quantities and dimensions.

The valve seat of these valves is controlled by a closing element. Here the incident flow against this closing element occurs endways through the valve seat. To a large extent this incident flow occurs centrally, so that the fluid flows uniformly or symmetrically past the circumferential surface of the closing element. Tests have shown that oscillations are thereby induced in the closing element in a radial direction, that is transversely to the longitudinal axis of the valve. A disadvantage of these radial oscillations is that they make pressure control through electronic activation of such a valve in a hydraulic system more difficult. That is to say the radial oscillations have a negative influence on a pressure adjustment accuracy of the valve.

The aim of the disclosure is to damp these radial oscillations of the closing element through simple design measures that can be cost-effectively implemented on the valve, and indirectly also to improve the pressure adjustment characteristics of a hydraulic system fitted with such a valve.

SUMMARY

An electromagnetically actuatable valve is equipped with a shut-off element, which comprises flow-directing means. These flow-directing means ensure that the incident flow against the closing element is no longer central or symmetrical but rather eccentric or asymmetrical, so that the flow passes unevenly around closing element. Accordingly, a greater or lesser volume of fluid flows past a segmental portion of the overall circumference of the closing element, depending on the orientation of the flow-directing means relative to the closing element, which consequently produces a resultant transverse force, which deflects the closing element radially in relation to its longitudinal axis when the valve is opened or closed. Since the shut-off element is rigidly anchored in the valve, the transverse force always acts on the closing member in the same radial direction and the closing element is deflected in the same preferred direction by each lifting movement.

The flow-generated transverse force exerts a stabilizing influence on the lifting movement of the closing element by damping any excitation of radial oscillations in the closing element. It may be said, therefore, that the lifting movement of the closing element is more controlled than in the state of the art and thereby improves the control characteristics of the valve and of a hydraulic circuit equipped with such a valve.

Further advantages or advantageous developments of the disclosure emerge from the dependent claims or the following description.

The measures required in order to form flow-directing means according to the disclosure on the shut-off element are technically simple and thereby relatively inexpensive to implement. This applies particularly if the shut-off element is of bolt-shaped design and the flow-directing means are integrally formed with the existing means needed to fix a shut-off element to the seat body. In this case it is even possible just to replace a known shut-off element with a shut-off element according to the disclosure in the course of ongoing series production, without generating additional assembly costs in the process.

In valves having a plurality of inlet ports, which open into a common rising bore of the valve body, flow-directing means according to the disclosure can serve to prevent constituent flows from various inlet ports directly colliding with one another and producing unwanted eddying in the overall fluid flow to the closing element. By matching the cross sections of the inlet bores to the dimensions of a gap between the outer circumference of the flow-directing means on the shut-off element and the wall of the rising bore, it is possible to further homogenize and smooth the flow. This also applies for the dimensioning of a geometric distance of the end face of then flow-directing means from the valve seat, and for an angle of inclination at which an end face or a slot of the flow-directing means are inclined in relation to a longitudinal axis of the valve and/or to the manner and way in which this inclined end face is designed.

BRIEF DESCRIPTION OF THE DRAWINGS

Exemplary embodiments of the disclosure are represented in the drawings and described in more detail in the following description. For the overall construction of the valve and its function, reference is made to the disclosures of DE 10 2010 002 469 A1 and DE 10 2011 079 339 A1.

DETAILED DESCRIPTION

Figure 1:
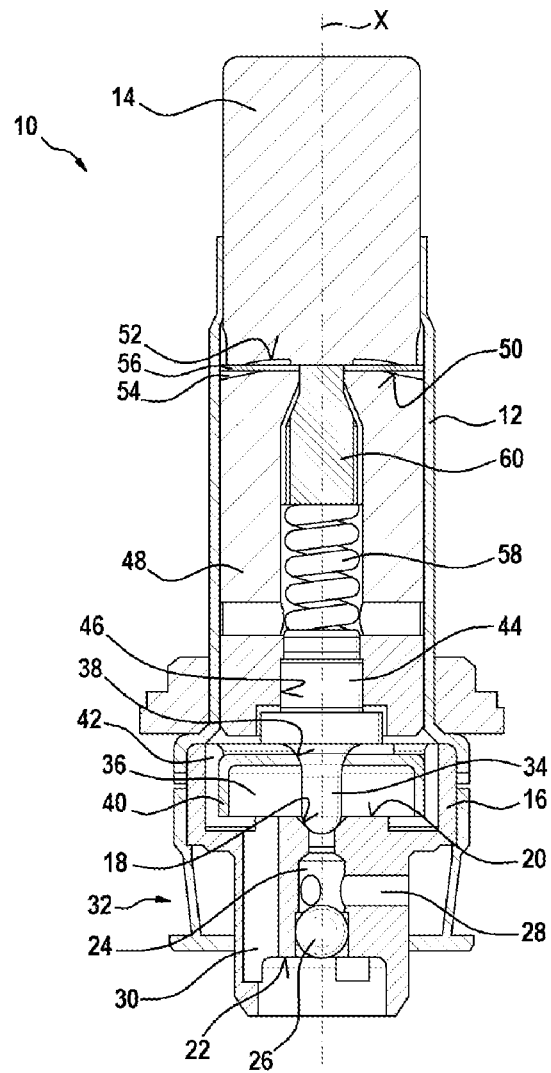
FIG. 1 shows a longitudinal section through an electromagnetically actuatable valve known from the state of the art.

FIG. 1 shows a longitudinal section through an electromagnetically actuatable valve 10 known from the state of the art. For the sake of clarity, a representation of a solenoid that completes this valve 10 was deliberately omitted. The valve 10 comprises a sleeve-shaped valve housing 12, into the upper, open end of which in FIG. 1 a plug-shaped pole body 14 composed of magnetically conductive material is inserted. This pole body 14 is firmly connected to the valve housing 12. A lower, open end of the valve housing 12 in FIG. 1 is closed by a seat body 16, which is likewise firmly connected to this valve housing 12. This seat body 16 forms a valve seat 18, which is arranged on the longitudinal axis X-X of the valve 10 and is formed at the base of a first counterbore 20 open towards the inside of the valve housing 12. The valve seat 18 itself is embodied in the form of a conical seat, for example. Opposite the counterbore 20, open towards the inside of the valve housing 12, a second counterbore 22, open outwardly towards the surroundings of the valve 10, is formed on the seat body 16. The latter counterbore is situated on a portion of the seat body 16, the outside diameter of which is reduced compared to the outside diameter of the seat body 16 in the area of the first counterbore 20. A rising bore 24 running along the longitudinal axis X-X of the valve 10 in the seat body 16 connects the two counterbores 20, 22 together. Towards the outwardly open, second counterbore 22 the rising bore 24 is closed by means of a shut-off element 26. In this exemplary embodiment this is a ball, which is matched to the diameter of the rising bore 24, in such a way that a press-fit connection can be produced between the shut-off element 26 and the wall of the rising bore 24. A radially running inlet port 28 opens into the rising bore 24 above the shut-off element 26. There are multiple such inlet ports 28 in the circumferential direction of the rising bore 24, this being represented by a circular orifice cross-section above the shut-off element 26 and offset to the left of the longitudinal axis X-X of the valve. The valve seat 18 is situated at the end of the rising bore 24 facing the first counterbore 20. An outlet port 30 can be seen running radially offset in relation to the rising bore 24 and coaxially with the longitudinal axis X-X of the valve 10. This outlet port 30 also connects the two counterbores 20, 22 together. A filter 32 is attached externally to the seat body 16 at the level of the inlet port 28. This filter comprises a frame-like filter body (not visible) with openings, which are covered by filter fabric, through which fluid flows into the inlet port 28 of the valve 10. Where the inlet port 28 opens into the rising bore 24, this fluid flow is deflected at right-angles, upwards according to FIG. 1, and delivered to the valve seat 18. According to FIG. 1 this valve seat 18 is closed by a closing element 34, so that no fluid can pass into a fluid chamber 36 of the valve 10 situated above the valve seat 18 and enclosed by the wall of the first counterbore 20. Under a lifting movement of the closing element 34, fluid flows through the valve seat 18 into this fluid chamber 36 and from there passes through a centrally arranged restrictor 38 of a cap-shaped throttle element 40, which covers the open end of the first counterbore 20, to a grooved recess 42 in the wall of the first counterbore 20. This recess 42 provides a fluid-ducting connection between the first fluid chamber 36 and the outlet port 30 of the valve 10, wherein the fluid flow, after passing through the restrictor 38, is once again deflected at right-angles and flows downwards out of the valve 10 in the opposite direction to the direction of flow in the rising bore 24 according to FIG. 1.

The closing element 34 for controlling the valve seat 18 is formed on a tappet 44, which is inserted by its end, remote from the valve seat 18 and of thicker outside diameter, into an assigned longitudinal recess 46 of a sleeve-shaped valve armature 48, and is thereby firmly connected to the valve armature 48. This valve armature 48 is moveably guided in the valve housing 12 in the direction of the longitudinal axis X-X of the valve 10. In the closed state of the valve 10 represented in FIG. 1, a working air gap 54, in which a washer-shaped flat spring 56 is accommodated, exists between an end face 50 of the valve armature 48 remote from the valve seat 18 and a pole body end face 52 situated opposite this end face 50. This spring is supported in the area of its outside diameter on the valve armature 48 and in the area of its inside diameter on the pole body 14. The flat spring 56 therefore provides one of the component forces serving to press the closing element 34 against the valve seat 18 indirectly via the valve armature 48. A second component force is delivered by a spiral spring 58, which is accommodated inside the valve armature 48. This is supported, on the one hand, on the widened end of the tappet 44 holding the closing element 34, and on the other indirectly via a support bushing 60 on the pole body end face 52, the support bushing 60 protruding through a central opening of the washer-shaped flat spring 56.

A solenoid, not shown in FIG. 1, which can be electrically energized, is fitted onto the valve housing. A magnetic flux occurring when this solenoid is energized produces magnetic attraction forces between the valve armature 48 and the pole body 14, causing the valve armature 14 to move upwards according to FIG. 1 towards the pole body 14, so that the working air gap 54 originally existing between these components is reduced. Since the closing element 34 is firmly connected to the valve armature 48, the lifting of the valve armature 48 causes the closing element 34 to lift off from the valve seat 18, thereby hydraulically connecting the inlet port 28 to the outlet port 30 via the fluid chamber 36, the restrictor 38 of the throttle element 40 and the recess 42.

The lifting movement of the valve armature 48 occurs in opposition to the return forces of the flat spring 56 and the spiral spring 58, which are further pre-tensioned as a result of the lifting movement. With the withdrawal of an electrical current from the solenoid and the cessation of the magnetic forces, these spring forces cause the valve armature 48 to return to the basic position shown in FIG. 1, which is evidenced by the closing element 34 being mechanically pressed onto the valve seat 18, thereby interrupting the fluid connection of the inlet port 28 to the outlet port 30.

Figure 2:
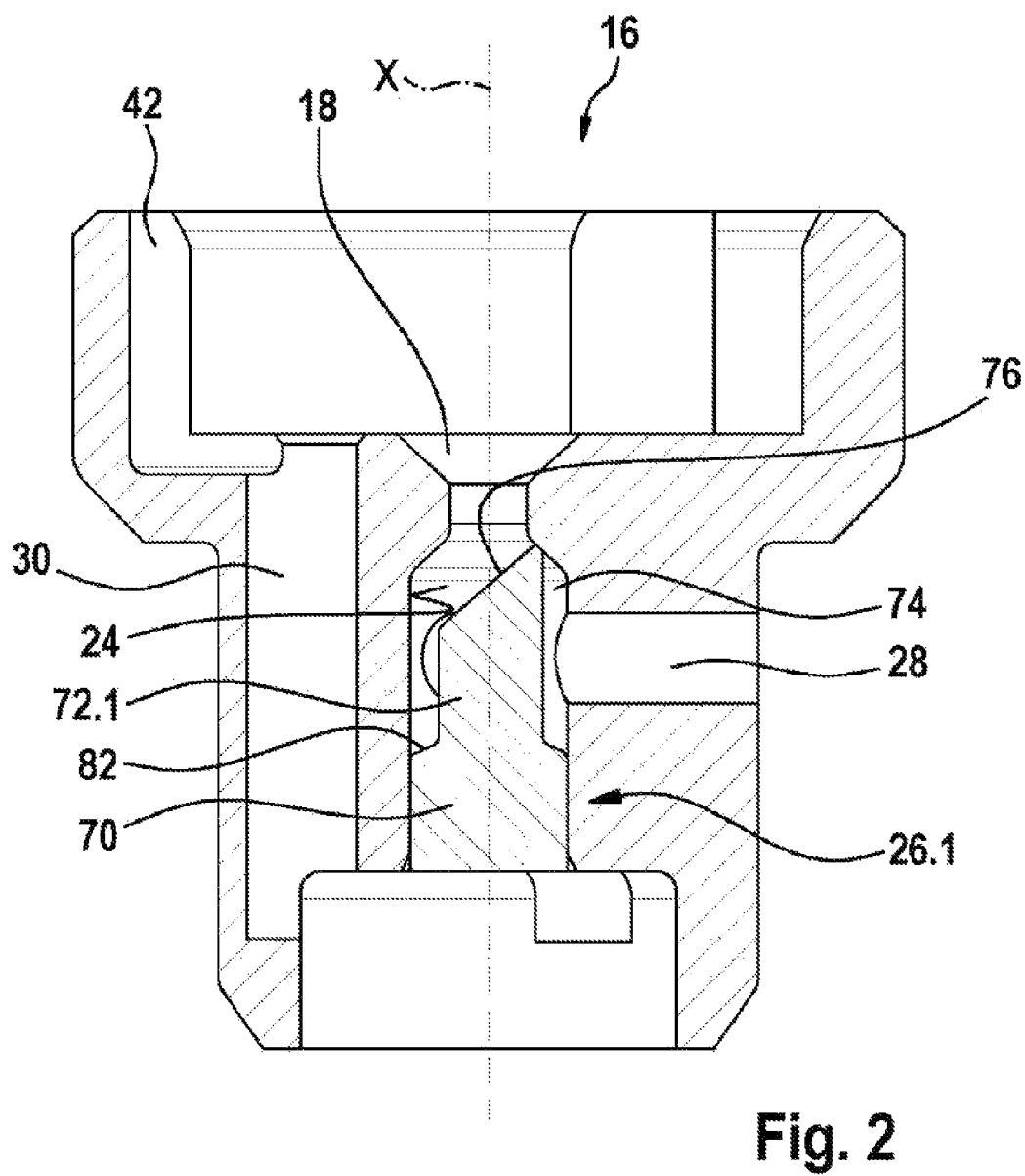
FIG. 2 shows a longitudinal section of a seat body of this valve, wherein this seat body is equipped with a first exemplary embodiment of a shut-off element.

FIG. 2 shows a longitudinal section of the seat body 16 of the valve 10 with a shut-off element 26 formed according to the disclosure. The geometry of the seat body 16 corresponds to that of the valve 10 according to FIG. 1, for which reason components fulfilling the same function are provided with the same reference numerals as in FIG. 1.

In contrast to FIG. 1 this seat body 16 is provided with a first embodiment of a shut-off element 26.1 according to the disclosure. This shut-off element 26.1 is of bolt-shaped design and comprises a cylindrically shaped fixing portion 70 and a likewise cylindrical flow-directing portion 72.1 arranged coaxially with the fixing portion 70. The fixing portion 70 and the flow-directing portion 72.1 are integrally formed with one another, the fixing portion 70 having a larger outside diameter than the flow-directing portion 72.1. A transition from the fixing portion 70 to the flow-directing portion 72.1 is formed as a right-angled shoulder 82, for example. With the fixing portion 70 the shut-off element 26.1 is pressed into the rising bore 24 from the second counterbore 22 of the seat body 16, and with the valve seat 18 closed thereby prevents a hydraulic short-circuit between at least the one inlet port 28 and the outlet port 30. Towards the inside of the valve housing 12 the flow-directing portion 72.1 adjoins the fixing portion 70 and at least in some areas covers that area of the seat body 26.1 at which the inlet port or inlet ports 28 open(s) into the rising bore 24. A wider or narrower annular gap 74, into which the inlet ports 28 open, is formed between the components, depending on the outer circumference of the flow-directing portion 72.1 and the inner circumference of the wall of the rising bore 24. The annular gap 74 or an axial coverage of the orifice cross sections of the inlet ports 28 by the flow-directing portion 72.1 of the shut-off element 26.1 prevents incoming fluid flows from various directions colliding directly with one another and forming a highly turbulent overall fluid flow, which is ultimately incident upon the closing element 34 of the valve 10. A front-face end 76 of the flow-directing portion 72.1 of the shut-off element 26.1 is inclined in relation to the longitudinal axis X-X of the valve 10 and the seat body 16 at an angle of inclination that can be fixed for a specific application. For example, the front-face end 76 forms a plane inclined face. It would be equally feasible, however, instead of making the front-face end 76 plane, to design it with a convex or concave or spherical shape.

It is possible, via the shaping and/or inclination of the front-face end 76 of the flow-directing portion 72.1 in relation to the longitudinal axis X-X of the valve 10, and the axial length and the diameter of the flow-directing portion 72.1 of the shut-off element 26.1, to direct the incident fluid flow against the closing element 34 (FIG. 1) in such a way that this incident flow is eccentric or asymmetrical, and the valve armature 48 is thereby subjected to a stabilizing, transverse force damping any radial oscillations, when under magnetic force it performs a lifting movement.

Figure 3:
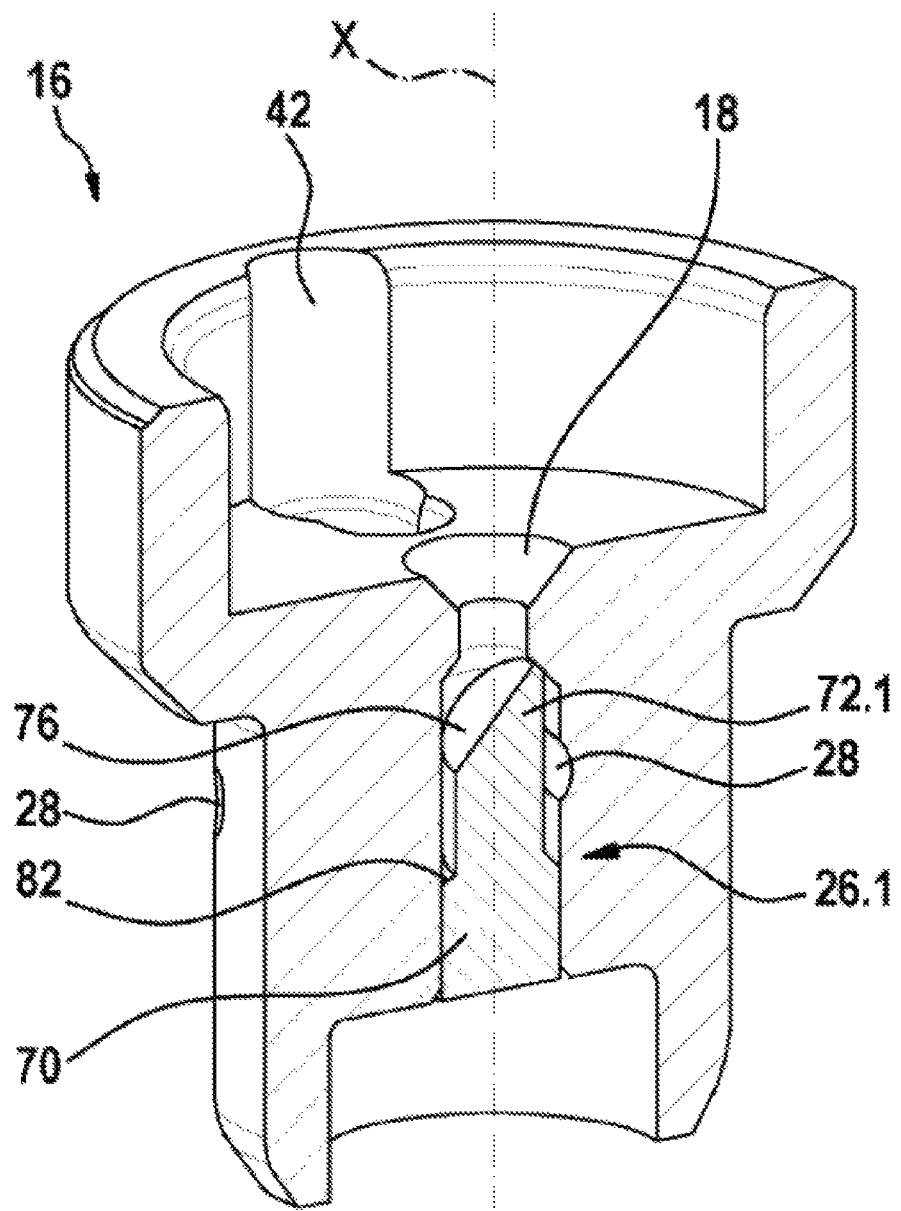
FIG. 3 shows a perspective view of a seat body with shut-off element according to FIG. 2 inserted and FIG. 4 shows a second exemplary embodiment of a shut-off element according to the disclosure, likewise in a perspective view.
Figure 4:
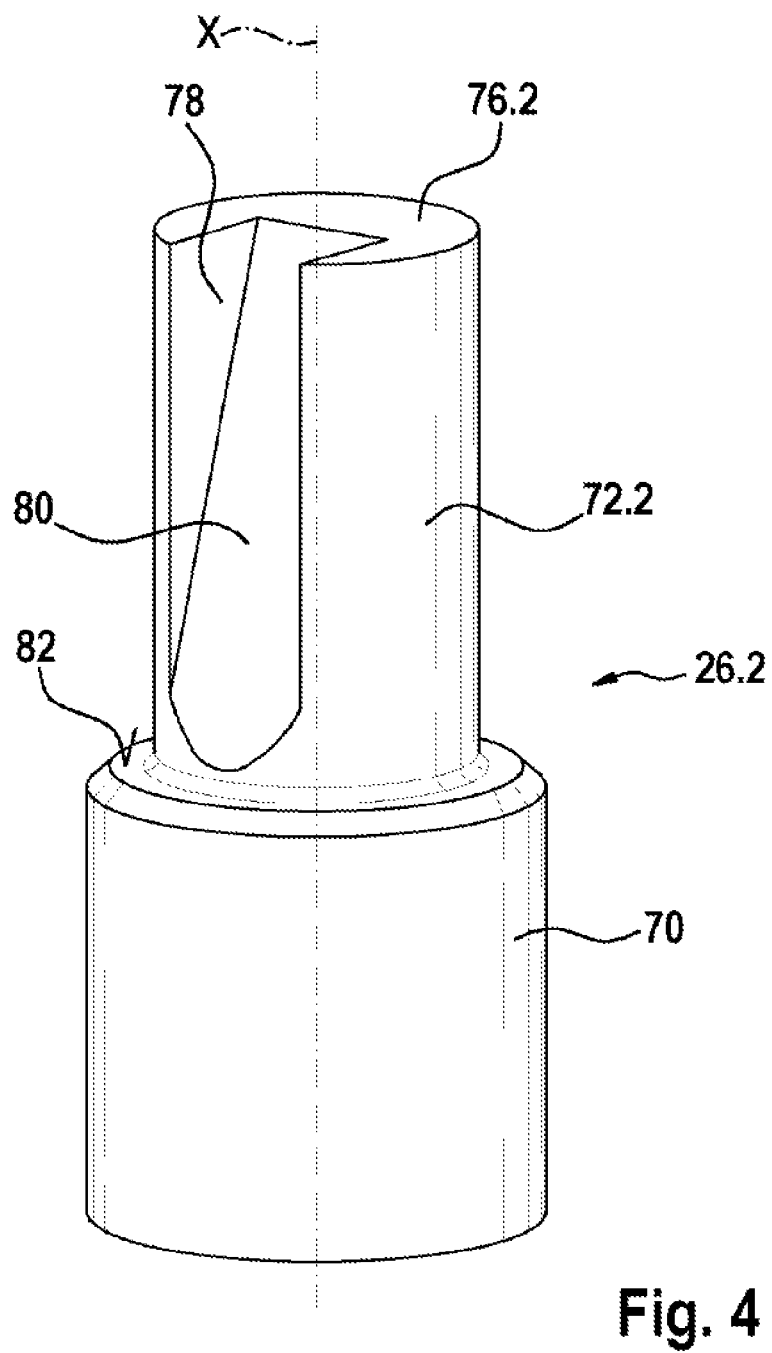

For greater ease of understanding, FIG. 3 in a perspective view again shows a seat element 16 with shut-off element 26.1 according to the disclosure. The reference numerals from FIGS. 1 and 2 are adopted for corresponding components. More clearly visible in this representation are the valve seat 18 and the recess 42 in the wall and at the base of the first counterbore 20 intended to represent a fluid-ducting connection of this counterbore 20 to the outlet port 30 of the seat body 16, not visible here In contrast to the exemplary embodiment according to FIGS. 2 and 3, in the second exemplary embodiment according to FIG. 4 the bolt-shaped shut-off element 26.2 is provided with a cylindrical, flow-directing portion 72.2, which has a horizontal, plane front-face end 76.2 and in addition is provided with a grooved slot 78. Its slot width is of smaller dimension than the outside diameter of the flow-directing portion 72.2, so that the slot 78 is defined on both sides by remaining circumferential segments of the flow-directing portion 72.2. The slot 78 extends over the entire length of the flow-directing portion 72.2 and is open at the side. The slot depth of the slot 78 increases continuously with increasing distance from the fixing portion 70, so that the slot base 80 forms a plane, inclined face, the angle of inclination of which in relation to the longitudinal axis X-X of the shut-off element 26.2 can be fixed for a specific application. The slot 78 has a flow-directing effect comparable to the inclined front-face end 76.1 of the shut-off element 26.1 according to FIGS. 2 and 3, in that it also ensures that the incident flow against the closing element 34 (FIG. 1) of a valve 10 equipped with a shut-off element 26.2 of such a design is eccentric or asymmetrical. As already explained, the asymmetrical incident flow on the closing element 34 produces a transverse force damping radial oscillations and stabilizing the lifting movement of the valve armature 48 (FIG. 1).

Modifications or additions to the exemplary embodiments described are obviously feasible without departing from the basic idea of the disclosure.

The invention claimed is:

1. An electromagnetically actuatable valve comprising:
   a seat body defining a valve seat, at least one fluid-delivering inlet port, and at least one fluid-discharging outlet port; and
   a shut-off element configured to interrupt a hydraulic short-circuit between the inlet port and the outlet port, the shut-off element including a flow-directing mechanism,
   wherein the shut-off element is of a bolt-shaped configuration and comprises a fixing portion together with the flow-directing mechanism, the flow-directing mechanism including a flow-directing portion of reduced outside dimensions compared to the fixing portion.

2. The electromagnetically actuatable valve as claimed in claim 1, wherein the flow-directing mechanism is integrally formed with the shut-off element.

3. The electromagnetically actuatable valve as claimed in claim 1, wherein the shut-off element has a transition from the fixing portion to the flow-directing portion that is configured as a right-angled shoulder.

4. The electromagnetically actuatable valve as claimed in claim 1, wherein the flow-directing portion of the shut-off element comprises a front-face end, which faces the valve seat and which is inclined at an angle of inclination in relation to a longitudinal axis of the valve.

5. The electromagnetically actuatable valve as claimed in claim 1, wherein the flow-directing portion of the shut-off element comprises a slot running at an angle of inclination in relation to its longitudinal axis.

6. The electromagnetically actuatable valve as claimed in claim 1, wherein:
   at least the one inlet port runs radially in relation to the longitudinal axis of the seat body and opens into a rising bore, at one end of which the valve seat is formed,
   the rising bore runs parallel to the outlet port in the direction of the longitudinal axis of the seat body, and
   the flow-directing portion of the shut-off element at least in some areas covers that area of the rising bore at which the inlet port or inlet ports open(s) into the rising bore.

7. The electromagnetically actuatable valve as claimed in claim 6, wherein the shut-off element is anchored by a fixing portion to the end of the rising bore situated opposite the valve seat, forming one of a non-positive, positively interlocking, or cohesive material connection.

8. The electromagnetically actuatable valve as claimed in claim 4, wherein the front-face end of the shut-off element at least in some portions extends up to the valve seat of the seat body.

9. The electromagnetically actuatable valve as claimed in claim 7, wherein the shut-off element is pressed by the fixing portion to the end of the rising bore situated opposite the valve seat.

10. The electromagnetically actuatable valve as claimed in claim 1, wherein the electromagnetically actuable valve is configured as a pressure regulating valve of a vehicle brake system with traction control.

* * * * *